Patented Feb. 22, 1927.

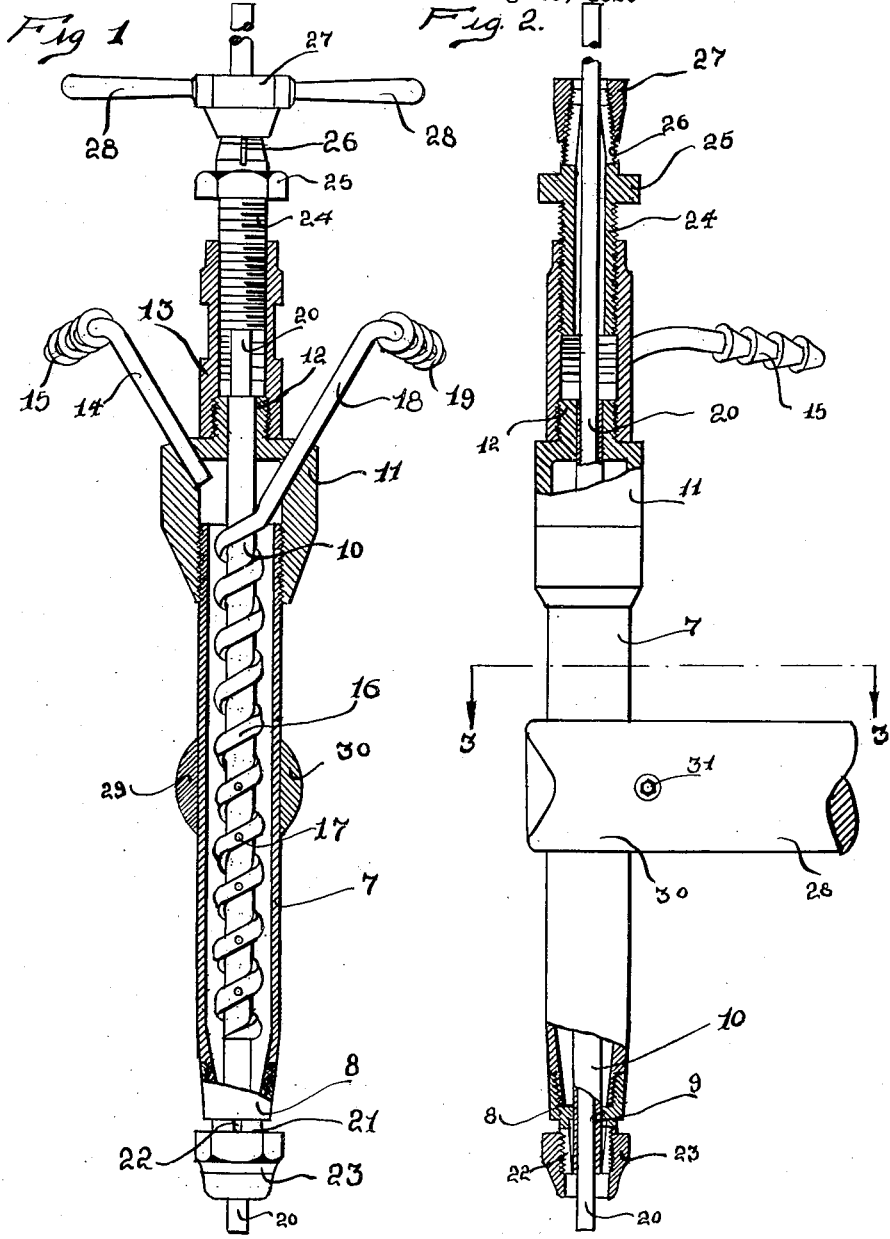

1,618,383

UNITED STATES PATENT OFFICE.

BENJAMAN P. LLOYD, OF DETROIT, MICHIGAN.

SPOT-WELDER POINT AND POINT RETAINER.

Application filed August 26, 1926. Serial No. 131,563.

My invention relates to a new and useful improvement in a spot welder and has for its object the provision in a spot welder of an improved cooling mechanism whereby the electrode will be efficiently cooled at all times and the cooling medium transmitted into close proximity to the welding point.

Another object of the invention is the provision of a coil for delivering the cooling medium around and in close proximity to the electrode.

Another object of the invention is the provision of a welder of this class in which the electrode extends through the shank or cooling member.

Another object of the invention is the provision of a sealing mechanism whereby the cooling medium is prevented from coming directly into contact with the electrode.

Another object of the invention is the provision of an electrode which may be fed into operative position as it is used so that an economy in the use of the device results in that there is no waste material resulting from the use of the welding point, the welding point consisting of a movable rod which may be moved into position as it is used.

Another object of the invention is the provision of a feeding mechanism for feeding the welding point as desired.

Another object of the invention is the provision of clamping mechanism for clamping the apparatus on a suitable support.

Another object of the invention is the provision of a clamping mechanism for clamping the electrode or welding point in any desired position for operation.

Other objects will appear hereinafter.

The invention consists in the combination and arrangement of parts hereinafter described and claimed.

The invention will be best understood by a reference to the accompanying drawings which form a part of this specification and in which, Fig. 1 is a central vertical sectional view of the invention with a part broken away and a part in side elevation.

Fig. 2 is a side elevational view of the invention with parts broken away and parts shown in section.

Fig. 3 is a fragmentary sectional view taken on substantially line 3—3 of Fig. 2.

As shown in the drawings the invention comprises a casing 7 which is formed tubular except adjacent its lower end 8, the lower end being provided with a bore 9 in which is suitably secured a longitudinally extending tube 10, the connection between the casing tube 10, the connection between the casing 7 and the lower end of the tube 19 being such as to prevent escape of liquid from the casing 7 around the tube 10. The upper end of the casing 7 is exteriorly threaded for the reception of a cap 11 having a neck 12 on which is threaded a sleeve 13. The tube 10 projects into the neck 12 and is welded, soldered or otherwise secured thereto so as to prevent escape of liquid from the casing 7 through the cap 11 around the tube 10. Projected into the cap 11 so as to communicate with the interior of the casing 7 is an outlet tube 14 provided with a nozzle 15, to which a hose or other suitable conduit may be attached. Coiled around the tube 10 interiorly of the casing 7 is a hollow coil 16 having a plurality of perforations 17 formed throughout its length and open at its lower end, this coil terminating in a pipe 18 which projects through the cap 11 and carries a nipple 19 to which a hose or other suitable conduit may be attached which may be connected to a suitable source of water supply or other cooling medium so as to deliver the cooling medium interiorly of the casing 7 around the tube 10. Projected through the tube 10 is a rod 20 which projects outwardly through the end 8 of the casing. The casing 8 is provided with the extended exteriorly threaded portion 21 which is slit as at 22 and provided with a nut 23 so that the rod 20, which serves as the electrode or welding point when projected through the split portion 21, may be clamped by this split portion upon the threading of the nut 23 thereon, this split portion 21 being tapered as shown clearly in Fig. 2. The tube 10 extends into this split portion and is also split. When the rod 20 is extended the proper distance beyond the end of the casing 7 for practical purposes the nut 23 may be threaded on the portion 21 and securely clamp this rod 20 in the desired position for welding. Threaded into the sleeve 13 is an exteriorly threaded sleeve 24 provided with a hexagonal collar 25 to provide a nut whereby the sleeve 24 may be rotated. This sleeve 24 is provided with a reduced split portion 26, upon which is adapted to be threaded the nut 27, carrying the handles 28. When the rod 20 is fed the proper distance a threading of the nut 27 will serve to bring the split portion 26 into clamping engagement with the rod 20. A further turning of the nut 27 will effect a turning of the sleeve 24 so as to feed the rod 20 as desired. When the rod 20 has been fed down the length of the sleeve 24 the nut 27 may be loosened and the sleeve 24 threaded upwardly so as to again engage the rod 20, after which the nut 27 may be moved to tightening position and the feeding of the rod 20 continued as explained. When the rod 20 is used to the extent that the reduced portion 26 may no longer clamp it a further feeding of the rod 20 may be effected by a new rod which is inserted into the device and clamped by the reduced portion 26, the new rod forcing the unused portion of the old rod through the reduced portion 21, so that the electrode is used in its entirety with no waste at all.

I have shown a clamping arm 28 having a loose jaw 29 co-operating with the integral jaw 30, these jaws embracing the casing 7 and being moved into clamping relation thereto by means of the screw 31. This method of clamping the casing is a simple and effective one permitting the casing to be moved longitudinally relatively to the arm 28.

It will be evident that the cooling medium delivered through the pipe 18 and the coil 16 is brought into close contact with the electrode 20, whereby a maximum amount of cooling is effected. The cooling fluid is also delivered into close proximity to the working point of the electrode so that the cooling is effected at that point where most desired. Furthermore by having the coil 16 open at its open end the cooling fluid is delivered in maximum quantity at the lower end of the casing 7, so that the maximum cooling is effected at this end of the casing, the lower end of the electrode becoming, of course, most quickly heated.

The advantages of the structure set out will be believed clearly apparent from the description of the device given and a durable structure is provided which permits of economy in manufacture.

While I have illustrated and described the preferred form of my invention, I do not wish to limit myself to the precise form of structure shown, but desire to avail myself of such variations and modifications as may come within the scope of the appended claims.

Having thus described my invention what I claim as new and desire to secure by Letters Patent is:

1. A device of the class described comprising: a casing; a welding point projected longitudinally through said casing centrally thereof, means for delivering a cooling medium to said casing in close proximity to said welding point; and means for conducting said cooling medium from said casing.

2. A device of the class described comprising: a casing; a welding point projected longitudinally through said casing; means for conducting a cooling fluid into said casing for cooling said welding point; and means for feeding said welding point through said casing at will.

3. In a device of the class described; a casing: a welding point projected through said casing; means for moving said welding point longitudinally of said casing at will; and means for locking said welding point in fixed relation to said casing at will.

4. A device of the class described comprising: a casing; a welding point projected through said casing; means for conducting a cooling fluid into said casing in close proximity to said welding point; outlet means for conducting said cooling fluid from said casing; a tube positioned in said casing and embracing said welding point for sealing said welding point from said cooling fluid.

5. A device of the class described comprising: a casing; a welding point projected through said casing, means for conducting a cooling fluid into said casing in close proximity to said welding point; outlet means for conducting said cooling fluid from said casing; a tube positioned in said casing and embracing said welding point for sealing said welding point from said cooling fluid; and means for moving said welding point longitudinally of said casing at will.

6. A device of the class described comprising: a casing, a welding point projected through said casing; means for conducting a cooling fluid into said casing in close proximity to said welding point; outlet means for conducting said cooling fluid from said casing; a tube positioned in said casing and embracing said welding point for sealing said welding point from said cooling fluid; means for moving said welding point longitudinally of said casing at will; and means for locking said welding point against longitudinal movement in said casing.

7. A device of the class described comprising: a casing; a welding point extending therein longitudinally thereof; a coil embracing said welding point for conducting cooling fluid into said casing; and means for conducting said cooling fluid out of said casing.

In testimony whereof I have signed the foregoing.

BENJAMAN P. LLOYD.